US011449300B2

(12) United States Patent
Xiao et al.

(10) Patent No.: US 11,449,300 B2
(45) Date of Patent: Sep. 20, 2022

(54) AUDIO OUTPUT DEVICE, ELECTRONIC DEVICE, AND AUDIO PROCESSING SYSTEM DEVICE

(71) Applicant: SAMSUNG ELECTRONICS CO., LTD., Suwon-si (KR)

(72) Inventors: Bowu Xiao, Guangzhou (CN); Jianhong Li, Guangzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 16/867,748

(22) Filed: May 6, 2020

(65) Prior Publication Data
US 2020/0356335 A1    Nov. 12, 2020

(30) Foreign Application Priority Data

May 9, 2019    (CN) .......................... 201910383981.5
Apr. 9, 2020   (KR) .......................... 10-2020-0043601

(51) Int. Cl.
*H03G 5/00*    (2006.01)
*G06F 3/16*    (2006.01)
*H01Q 1/24*    (2006.01)
*H01Q 1/46*    (2006.01)
*H04R 3/12*    (2006.01)

(52) U.S. Cl.
CPC ............. *G06F 3/162* (2013.01); *H01Q 1/243* (2013.01); *H01Q 1/46* (2013.01); *H04R 3/12* (2013.01)

(58) Field of Classification Search
CPC ....................................................... H03G 5/00
See application file for complete search history.

(56) References Cited

U.S. PATENT DOCUMENTS 8,581,792 B2    11/2013  Mukai et al.
9,923,607 B2     3/2018  Yoshino et al.
(Continued)

FOREIGN PATENT DOCUMENTS

CN    101359764 A    2/2009
CN    101662064 A    3/2010
(Continued)

OTHER PUBLICATIONS

Communication dated Feb. 3, 2020, issued by the State Intellectual Property Office of the People's Republic of China in counterpart Chinese Patent Application No. 201910383981.5.

*Primary Examiner* — Olisa Anwah
(74) *Attorney, Agent, or Firm* — Sughrue Mion, PLLC

(57) ABSTRACT

An audio output device includes a first communication interface configured to receive a first digital signal from an electronic device and transmit a second digital signal to the electronic device; at least one processor configured to convert the received first digital signal into a first analog signal and convert a second analog signal into the second digital signal; and a frequency modulation (FM) antenna configured to obtain FM signals to output the FM signals to the electronic device through the first communication interface. A ground terminal of the at least one processor is connected to a first terminal of the first communication interface, the FM antenna is connected to a second terminal of the first communication interface, and the FM signals are transmitted from the FM antenna to the second terminal of the first communication interface.

20 Claims, 8 Drawing Sheets

(56) References Cited

U.S. PATENT DOCUMENTS

2019/0058617 A1\* 2/2019 Kolsrud ............ H04L 12/40045
2019/0097365 A1   3/2019 Lee et al.
2019/0110119 A1   4/2019 Yoshino et al.

FOREIGN PATENT DOCUMENTS

| CN | 107728991 A   | 2/2018  |
| CN | 108886376 A   | 11/2018 |
| WO | 2008/114098 A1 | 9/2008  |
| WO | 2019/040540 A1 | 2/2019  |

\* cited by examiner

AUDIO OUTPUT DEVICE, ELECTRONIC DEVICE, AND AUDIO PROCESSING SYSTEM DEVICE

CROSS-REFERENCE TO RELATED APPLICATION(S)

This application is based on and claims priority under 35 U.S.C. § 119 to Chinese Patent Application No. 201910383981.5, filed on May 9, 2019, in the China National Intellectual Property Administration, and Korean Patent Application No. 10-2020-0043601, filed on Apr. 9, 2020, in the Korean Intellectual Property Office, the disclosures of which are incorporated by reference herein in their entireties.

BACKGROUND

1. Field

The disclosure generally relates to the field of audio processing technology, and more particularly, to an audio output device supporting a frequency modulation (FM) function, an electronic device, and an audio processing system.

2. Description of Related Art

With continuous updates and development of electronic technology, general analog 3.5 mm earphones interfaces or analog universal serial bus (USB) earphones interfaces on electronic devices are being replaced by digital USB earphones interfaces. Currently, audio interfaces on electronic devices are being developed toward digital USB interfaces.

The frequency modulation (FM) performance of general analog earphones is mainly improved by sharing a ground signal line of the analog earphones. That is, the ground signal line of the earphones is used as an antenna of an FM function of an electronic device. As shown in FIG. 1, general analog earphones include a left speaker LEFT, a right speaker RIGHT, and a reference ground signal line GND1 of a microphone and have a function of receiving FM signals via an FM antenna FM ANT.

In this case, an electronic device requires an analog switch configured to detect forward and backward plugging of the earphones, so as to achieve correct configuration of a signal line MIC1 and the ground signal line GND1 of the microphone. For example, a Type-C interface is used for the electronic device, one of A5/B5 terminals of the Type-C interface is connected to the ground signal line GND1, and the other one of the A5/B5 terminals is connected to the signal line MIC 1. With the use of the analog switch, regardless of forward and backward plugging of the earphones, the signal line MIC1 of the microphone may be correctly connected to a signal MIC input end of an audio codec included in the electronic device, and the ground signal line GND1 may be connected to an isolating circuit included in the electronic device. The isolating circuit included in the electronic device is used to isolate the FM signals from the ground and avoid connection of the FM signals to the ground so as to prevent noise interference on the FM signals.

However, as the audio interfaces of the electronic devices are gradually replaced by digital USB interfaces, the earphones in the related art will no longer be compatible with the electronic devices, but digital earphones using digital USB interfaces will be compatible with the electronic devices.

At present, the audio codec is generally integrated in the digital earphones. When an FM antenna and a ground signal line of earphones are still shared in digital earphones, not only is an isolating circuit still required, but also a noise amplitude of a ground signal line of the earphones increases to seriously affect the performance of the FM antenna. For example, the number of search channels decreases and the voice quality deteriorates, resulting in deterioration in FM experience of electronic device users.

SUMMARY

Provided are an audio output device, an electronic device, and an audio processing system.

Provided are an audio output device, an electronic device, and an audio processing system which are configured to overcome at least one of the defects described above.

Additional aspects will be set forth in part in the description which follows and, in part, will be apparent from the description, or may be learned by practice of the embodiments of the disclosure.

According to an embodiment, there is provided an audio output device including: a first communication interface configured to receive a first digital signal from an external electronic device and transmit a second digital signal to the external electronic device; at least one processor configured to convert the received first digital signal into a first analog signal and convert a second analog signal into the second digital signal; and a frequency modulation (FM) antenna configured to obtain FM signals and output the FM signals to the external electronic device through the first communication interface. A ground terminal of the at least one processor is connected to a first terminal of the first communication interface, the FM antenna is connected to a second terminal of the first communication interface, and the FM signals are transmitted from the FM antenna to the second terminal of the first communication interface.

The first communication interface includes a universal serial bus (USB) Type-C interface.

The first terminal of the first communication interface is at least one of a first ground terminal of the USB Type-C interface and a second ground terminal of the USB Type-C interface.

The second terminal of the first communication interface is at least one of the first ground terminal, the second ground terminal, and an auxiliary signal terminal of the USB Type-C interface, and the first terminal and the second terminal are terminals different from each other.

The audio output device further includes a microphone configured to generate the second analog signal based on an external sound, and a speaker configured to receive the converted first analog signal from the at least one processor and output the converted first analog signal.

The FM antenna includes a coaxial structure.

According to an embodiment, there is provided an electronic device including: at least one processor; a second communication interface configured to transmit a first digital signal to an external audio output device, and receive a second digital signal and frequency modulation (FM) signals from the external audio output device; and an FM receiving module configured to receive the FM signals from the second communication interface through a second terminal of the second communication interface. A first terminal of the second communication interface is grounded, the FM receiving module is directly connected to the second terminal of the second communication interface, and the FM signals are transmitted from the external audio output device to the second terminal of the second communication interface.

The second communication interface includes a USB Type-C interface.

The first terminal of the second communication interface is at least one of a first ground terminal of the USB Type-C interface and a second ground terminal of the USB Type-C interface.

The second terminal of the second communication interface is at least one of the first ground terminal, the second ground terminal, and an auxiliary signal terminal of the USB Type-C interface, and the first terminal and the second terminal are terminals different from each other.

A first end of the FM receiving module is connected to the at least one processor, a second end of the FM receiving module is connected to the second terminal of the second communication interface, and the received second digital signal is transmitted to the at least one processor through a third terminal of the second communication interface connected to the at least one processor.

The electronic device further includes a power management module configured to generate a power signal. A first end of the power management module is connected to the at least one processor, a second end of the power management module is connected to a fourth terminal of the second communication interface, and the power signal is output to the external audio output device through the fourth terminal of the second communication interface.

The electronic device is a smart phone including the second communication interface corresponding to a first communication interface of the external audio output device.

According to an embodiment, there is provided an audio processing system including an audio output device and an electronic device. The audio output device includes: a first communication interface configured to receive a first digital signal from the electronic device and output a second digital signal to the electronic device; at least one processor configured to convert the first digital signal into a first analog signal and convert a second analog signal into the second digital signal, the at least one processor being connected to a first terminal of the first communication interface; and a frequency modulation (FM) antenna connected to a second terminal of the first communication interface and configured to output FM signals through the second terminal of the first communication interface. The electronic device includes: a second communication interface configured to output the first digital signal to the audio output device, and receive the second digital signal and the FM signals from the audio output device; and an FM receiving module directly connected to a second terminal of the second communication interface and configured to receive the FM signals from the second terminal of the second communication interface.

The second communication interface is configured to receive the FM signals from the second terminal of the first communication interface through the second terminal of the second communication interface.

A first terminal of the second communication interface is grounded.

The first communication interface and the second communication interface are USB Type-C interfaces.

The first terminal of the first communication interface and the first terminal of the second communication interface are at least one of a first ground terminal of the USB Type-C interface and a second ground terminal of the USB Type-C interface.

The second terminal of the first communication interface and the second terminal of the second communication interface are any one of the first ground terminal, the second ground terminal, and an auxiliary signal terminal of the USB Type-C interface. The first terminal of the first communication interface and the second terminal of the first communication interface are terminals different from each other, and the first terminal of the second communication interface and the second terminal of the second communication interface are terminals different from each other.

The FM antenna includes a coaxial structure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
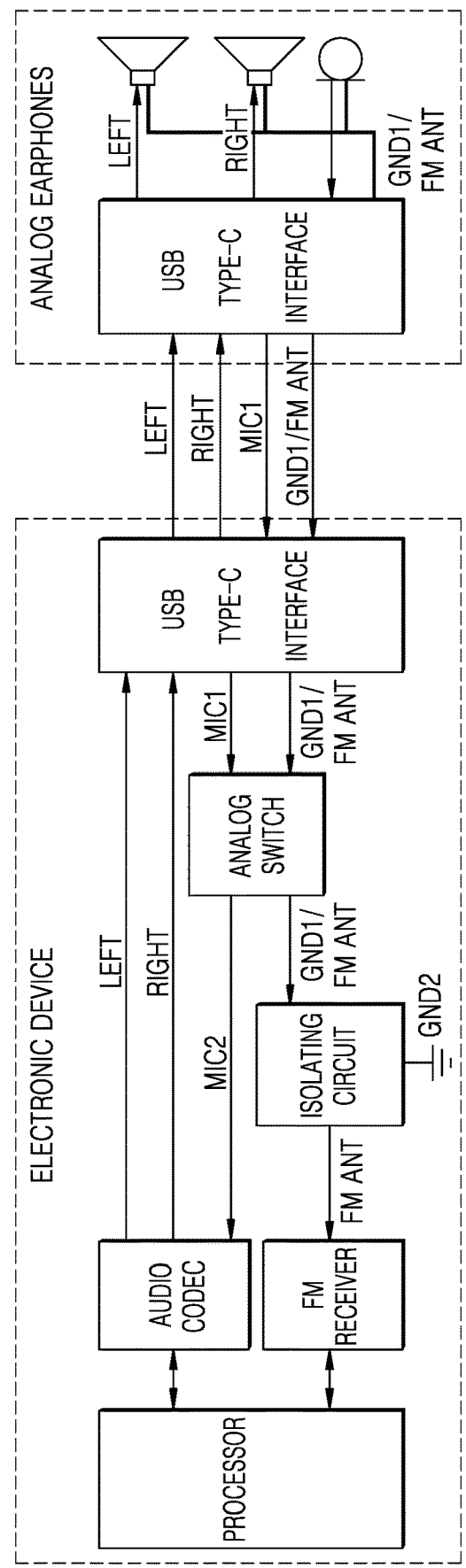
FIG. 1 illustrates a block diagram of general analog digital earphones and a corresponding electronic device.

Hereinafter, embodiments of the disclosure will be described in detail with reference to the accompanying drawings, such that those of ordinary skill in the art to which the disclosure pertains can easily implement the embodiments. The disclosure may, however, be embodied in many different forms and should not be construed as being limited to the embodiments set forth herein. In addition, parts irrelevant to the description of the disclosure are omitted to clearly describe the embodiments herein, and like reference numerals in the drawings denote like elements.

Terms used in the disclosure have been described as general terms currently used considering functions mentioned in the disclosure, but the terms may mean a variety of different terms depending on the intention or precedent of a person skilled in the art or the appearance of a new technology. Therefore, the terms used in the disclosure should not be interpreted only by the name of the terms, but should be interpreted based on the meaning of the terms and contents throughout the disclosure.

Throughout the disclosure, the expression "at least one of a, b or c" indicates only a, only b, only c, both a and b, both a and c, both b and c, all of a, b, and c, or variations thereof.

While terms such as "first," "second," etc., may be used to describe various components, such components must not be limited to the above terms. The above terms may be used only to distinguish one component from another.

Throughout the disclosure, when a portion is referred to as being "connected" to another portion, the portion can be "directly connected" to the other portion or the portion can be "electrically connected" to other portion with a intervening element therebetween. When a portion "includes" an element, another element may be further included, rather than excluding the existence of the other element, unless otherwise indicated.

The terms "in one embodiment", "in an embodiment", "according to an embodiment", "according to an embodiment of the disclosure", and the like mentioned in various places in the disclosure may not necessarily refer to the same embodiment.

The embodiments of the disclosure may be described in terms of functional block components and various processing steps. Such functional blocks may be realized by any number of hardware and/or software components configured to perform the specified functions. For example, the functional blocks of the disclosure may be implemented by one or more microprocessors, or by circuit configurations for a certain function. For example, the functional blocks may be implemented in various programming or scripting languages. The functional blocks may be implemented in algorithms that are executed on one or more processors. Furthermore, the disclosure could employ any number of conventional techniques for electronics configuration, signal processing and/or control, data processing and the like. The words "mechanism," "element," "means," and "configuration" may be used broadly and are not limited to mechanical or physical embodiments.

Furthermore, the connecting lines or connectors described herein are intended to represent functional relationships and/or physical or logical couplings between the various elements. It should be noted that many alternative or additional functional relationships, physical connections or logical connections may be present in a practical device.

Additional aspects, features, and advantages of certain embodiments the disclosure will be described in the following descriptions, and other portions may be clarified through the descriptions or may be learned through implementation of the disclosure.

Digital earphones according to embodiments are integrated with an audio codec. A structure of the digital earphones according to an embodiment will be described with reference to FIG. 2.

Figure 2:
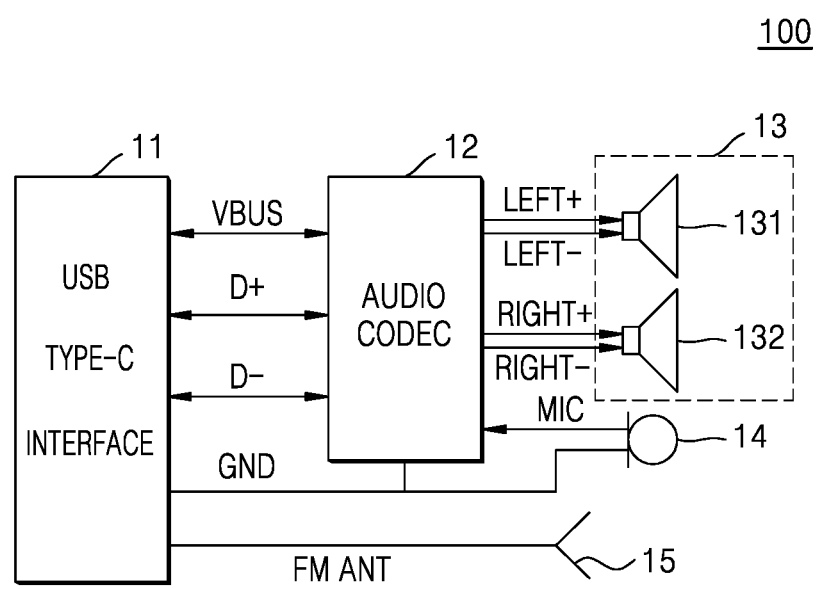
FIG. 2 illustrates a block diagram of digital earphones according to an embodiment.

FIG. 2 illustrates a structural diagram of digital earphones 100 according to an embodiment.

As shown in FIG. 2, the digital earphones 100 may include a first communication interface 11, an audio codec 12, a speaker 13, a microphone 14, and a frequency modulation (FM) antenna 15. For example, the speaker 13 may include a left speaker 131 and a right speaker 132. However, the embodiments described herein are not limited to the digital earphones 100, and may be applied to other audio output devices, for example, a digital headset. In addition, the audio output devices may be implemented as wearable devices. The audio codec 12 may be implemented by at least one processor.

The first communication interface 11 in a state of being connected to an electronic device 200 (shown in FIG. 4) may receive a first digital signal from the electronic device 200. For example, the first digital signal may include digital audio stream signals. The first communication interface 11 may receive the first digital signal from the electronic device 200 through a third terminal of the first communication interface 11. Here, the third terminal of the first communication interface 11 may be a data terminal of the first communication interface 11.

The audio codec 12 may convert the first digital signal received by the first communication interface 11 into a first analog signal, and output the first analog signal through the speaker 13. For example, the first analog signal may include analog audio signals.

The analog audio signals may include left channel signals LEFT+ and LEFT− and right channel signals RIGHT+ and RIGHT−. For example, the audio codec 12 may respectively output, through the left speaker 131 and the right speaker 132, the left channel signals LEFT+ and LEFT− and the right channel signals RIGHT+ and RIGHT− generated through the conversion.

The microphone 14 may generate a second analog signal by obtaining external sound. For example, the second analog signal may include analog microphone signals MIC.

The audio codec 12 may convert the second analog signal into a second digital signal, and output the second digital signal through the first communication interface 11. For example, the second digital signal may include digital microphone audio signals. The first communication interface 11 may output the second digital signal to the electronic device 200 through the third terminal of the first communication interface 11.

Here, the audio codec 12 may be a device or a computer program capable of coding or decoding digital audio streams. For example, the audio codec 12 may be an independent device capable of coding analog audios to digital audios and decoding digital audios to analog audios. In other words, the audio codec 12 may include an analog-to-digital (ADC) converter and a digital-to-analog (DAC) converter operating under the same clock to implement the above-mentioned coding and decoding functions. For example, the audio codec 12 may encode the second analog signal generated by the microphone 14 to the second digital signal, and decode the first digital signal received from the electronic device 200 to the first analog signal.

Figure 3:
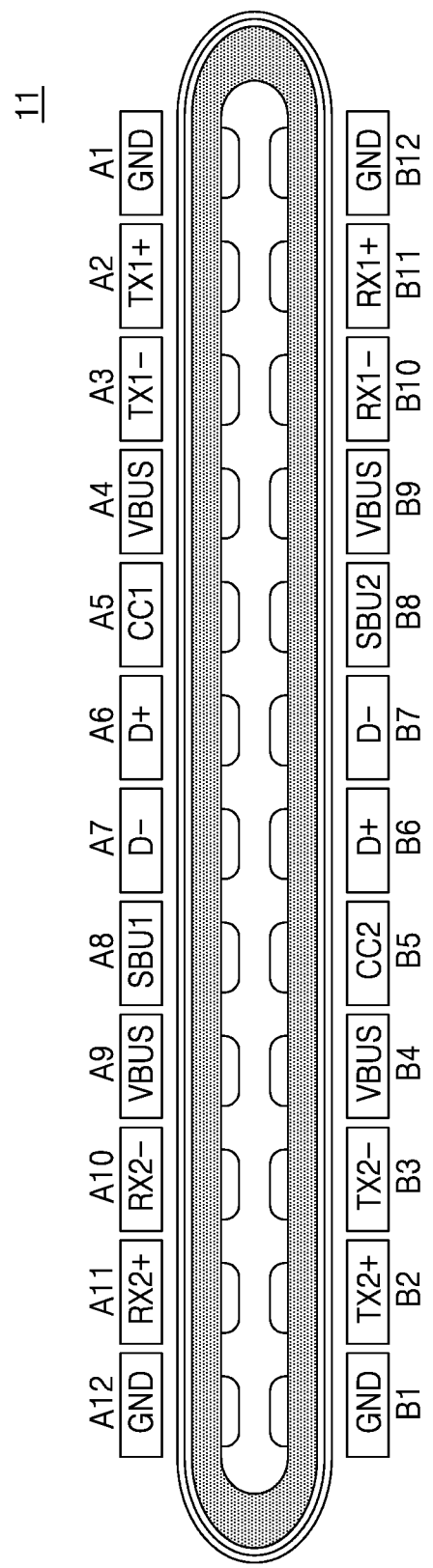
FIG. 3 illustrates a diagram of ports of a universal serial bus Type-C interface of a digital earphones side, according to an embodiment.

According to an embodiment, the first communication interface 11 may be a universal serial bus Type-C interface, that is, a universal serial bus (USB) Type-C interface of the digital earphones 100 side. FIG. 3 illustrates a diagram of ports of a universal serial bus Type-C interface of the digital earphones 100 side according to an embodiment. As shown in FIG. 3, the USB Type-C interface of the digital earphones 100 side is a universal serial bus Type-C plug, that is, a USB Type-C plug. The USB Type-C plug is referred to as a USB Type-C male. However, it should be understood that the disclosure is not limited thereto. The USB Type-C interface of the digital earphones 100 side may also be a USB Type-C socket, as long as the USB Type-C interface of the digital earphones 100 side may be compatible with and connected to the USB Type-C interface of the electronic device 200 side.

As shown in FIG. 3, the USB Type-C plug has a total of 24 terminals, which may be plugged forward or backward, that have high transmission speeds. An interface, which does not have directionality, may avoid incorrect plugging during its use so as to effectively reduce the failure rate.

An A1 (or B1) GND terminal and an A12 (or B12) GND terminal of the USB Type-C plug may be ground GND terminals. A2 TX1+ (or B2 TX2+) and A3 TX1− (or B3 TX2−) may be data transmitting terminals, and A10 RX2− (or B10 RX1−) and A11 RX2+ (or B11 RX1+) may be data receiving terminals. The data transmitting terminals and the data receiving terminals may be used to respectively transmit a first group configured by TX signals and a second group configured by RX signals.

According to an embodiment, the first communication interface 11 may transmit a ground signal to the electronic device 200 through a first terminal of the first communication interface 11. For example, the first terminal of the first communication interface 11 may be a ground terminal of the first communication interface 11. Additionally, when the first communication interface 11 a USB Type-C interface, the first terminal of the first communication interface 11 may be one of a first ground terminal of the USB Type-C interface and a second ground terminal of the USB Type-C interface. The first ground terminal of the USB Type-C interface may be the A1 (or B1) GND terminal of the USB Type-C plug, and the second ground terminal of the USB Type-C interface may be the A12 (or B12) GND terminal of the USB Type-C plug.

An A4 (or B4) VBUS terminal and an A9 (or B9) VBUS terminal of the USB Type-C plug may be terminals for bus power supply. An A5 CC1 (or B5 CC2) terminal may be a detection terminal, which may be, for example, used to detect a connection to distinguish forward and backward plugging, and may also be used to configure an interface mode to determine whether the interface is currently used as a charging interface, a data interface, a digital earphones interface, or a video output interface.

According to an embodiment, the first communication interface 11 may receive a power signal from the electronic device 200 through a fourth terminal of the first communication interface 11. For example, the fourth terminal of the first communication interface 11 may be a terminal for bus power supply of the first communication interface 11. In addition, when the first communication interface 11 is a USB Type-C interface, the terminal for bus power supply of the first communication interface 11 may include the A4 (or B4) VBUS terminal and the A9 (or B9) VBUS terminal of the USB Type-C plug.

An A6 (or B6) D+ terminal and an A7 (or B7) D− terminal of the USB Type-C plug may be terminals compatible with a general USB standard. For example, the D+ and D− terminals configured to transmit data are a pair of differential signal terminals compatible with a USB 2.0 standard. An A8 side band use (SBU)1 (or B8 SBU2) terminal of the USB Type-C plug may be an auxiliary signal SBU terminal.

When the first communication interface 11 is a USB Type-C interface, the D+ terminal and D− terminal of the USB Type-C interface configured to transmit data may receive the digital microphone audio signals from the audio codec 12 or transmit digital audio stream signals to the audio codec 12. Also, when the first communication interface 11 is a USB Type-C interface, the third terminal of the first communication interface 11 may include the D+ terminal and the D− terminal of the USB Type-C interface.

That is, the D+ terminal and the D− terminal may receive the digital audio stream signals from the electronic device 200 and transmit the received signals to the audio codec 12, and the D+ terminal and the D− terminal may also receive the digital microphone audio signals from the audio codec 12 and output the digital microphone audio signals to the electronic device 200.

The digital audio stream signals may include digital multimedia audio stream signals and digital voice audio stream signals during a telephone call.

A ground terminal of the audio codec 12 may be connected to the first terminal of the first communication interface 11. For example, the first terminal of the first communication interface 11 may be a ground terminal of the first communication interface 11.

When the first communication interface 11 is a USB Type-C interface, the ground terminal of the first communication interface 11 may be one of a first ground GND terminal of the USB Type-C interface and a second ground GND terminal of the USB Type-C interface.

For example, referring to FIG. 3, the first ground GND terminal may be one of the A1 (or B1) GND terminal and the A12 (or B12) GND terminal of the USB Type-C plug, and the second ground GND terminal may be the other one of the A1 (or B1) GND terminal and the A12 (or B12) GND terminal of the USB Type-C plug.

The FM antenna 15 may be connected to a second terminal of the first communication interface 11, and the first communication interface 11 may receive an FM signal from the FM antenna 15. The first communication interface 11 may output FM signals through the second terminal of the first communication interface 11. For example, the second terminal of the first communication interface 11 may be a terminal of the first communication interface 11 configured to implement an FM function.

The FM antenna 15 may be connected to the terminal of the first communication interface 11 configured to implement the FM function, so as to transmit the FM signals received from the FM antenna 15 through the terminal of the first communication interface 11 configured to implement the FM function.

That is, the FM antenna 15 may receive the FM signals and transmit the FM signals to a terminal of the first communication interface 11 which implements the FM function for output.

When the first communication interface 11 is a USB Type-C interface, the terminal of the first communication interface 11 configured to implement the FM function may be one of the first ground GND terminal of the USB Type-C interface, the second ground GND terminal of the USB Type-C interface, or the auxiliary signal SBU terminal of the USB Type-C interface. In another embodiment, the second terminal of the first communication interface 11 may be one of the first ground terminal of the USB Type-C interface, the second ground terminal of the USB Type-C interface, or the auxiliary signal SBU terminal of the USB Type-C interface.

For example, the auxiliary signal SBU terminal may be the A8 SBU1 (or B8 SUB2) terminal of the USB Type-C plug. It should be understood that the ground terminal of the first communication interface 11 configured to connect the ground terminal of the audio codec 12 and the terminal configured to implement the FM function (that is, the terminal connected to the FM antenna 15) are different terminals. Furthermore, the first terminal of the first communication interface 11 and the second terminal of the first communication interface 11 may be different terminals. For example, when the first terminal of the first communication interface 11 is the first ground terminal of the USB Type-C interface, the second terminal of the first communication interface 11 may be one of the second ground terminal of the USB Type-C interface and the auxiliary signal SBU terminal of the USB Type-C interface.

According to an embodiment, an FM function of digital earphones may be implemented by a first ground GND terminal of a USB Type-C interface, a second ground GND terminal of the USB Type-C interface, and an auxiliary signal SBU terminal of the USB Type-C interface. This is because when existing digital earphones using a digital USB interface are connected to an electronic device, the first ground GND terminal and the second ground GND terminal do not need to operate at the same time, and only one of the two GND terminals is needed to be connected to a ground of the digital earphones. The auxiliary signal SBU terminal is generally used for water vapor/water mist detection, and does not operate when the existing digital earphones are connected to the electronic device.

That is, according to an embodiment, an independent FM antenna circuit may be designed on the digital earphones side, and an idle terminal, when the existing digital earphones are connected to the electronic device, may be connected to the FM antenna circuit to realize the FM function. Accordingly, the FM antenna circuit may be compatible with an existing USB Type-C interface without changing the structure of the existing USB Type-C interface, and the digital earphones may be applied to various electronic devices having USB Type-C interfaces. In other words, the various electronic devices having the USB Type-C interfaces may be compatible with the digital earphones 100.

According to an embodiment, the audio codec 12 may be operated in the following method.

For example, when the first communication interface 11 is connected to the electronic device 200 and the electronic device 200 is powered on, the first communication interface 11 may receive a power signal from the electronic device 200 to supply power to the audio codec 12. For example, the first communication interface 11 may receive, through the fourth terminal of the first communication interface 11, a necessary power signal from the electronic device 200 to supply power to the audio codec 12.

When the first communication interface 11 is a USB Type-C interface, a VBUS terminal of the USB Type-C interface for bus power supply may receive the power signal from the electronic device 200.

Referring to FIG. 3, the VBUS terminal for bus power supply may be the A4 (or B4) VBUS terminal or A9 (or B9) VBUS terminal of the USB Type-C plug.

It should be understood that the electronic device 200 may include a USB Type-C interface corresponding to the USB Type-C interface of the digital earphones 100 side to implement a connection between the electronic device 200 and the digital earphones 100.

For example, when the digital earphones 100 are connected to the electronic device 200 and the electronic device 200 is powered on, the electronic device 200 may always supply a power supply voltage to the digital earphones 100. Specifically, the electronic device 200 may supply the power supply voltage to the digital earphones 100 by the VBUS terminal of the USB Type-C interface for bus power supply via the VBUS terminal of the USB Type-C interface of the digital earphones 100 side for bus power supply.

As described, digital earphones may support an FM function, and an independent FM antenna circuit may be used in digital earphones to realize the FM function of the digital earphones. Accordingly, the anti-interference ability and channel quality of an FM channel may be effectively improved.

In addition, in order to obtain better FM performance and reduce interference to an FM antenna, the FM antenna may be made of a material having good shielding performance and anti-interference performance in the design of the digital earphones 100. For example, the FM antenna 15 may be made of a coaxial line and may include a coaxial structure.

In addition, the interference to the FM antenna may also be reduced by designing an arrangement of various signal lines in the digital earphones 100. For example, the FM antenna 15 of the digital earphones 100 may be arranged to be far away from other signal lines (for example, a ground signal line, a power signal line, a data signal line, or the like). Specifically, the FM antenna 15 and other signal lines may be arranged such that the sum of distances between the FM antenna 15 and each of the signal lines is greater than or equal to a predetermined threshold. Specifically, the FM antenna 15 and the other signal lines may be arranged such that the sum of a first distance which is a distance between the FM antenna 15 and the ground signal line, a second distance which is a distance between the FM antenna 15 and the power signal line, and a third distance which is a distance between the FM antenna 15 and the data signal line is greater than or equal to the predetermined threshold. The predetermined threshold may be determined based on experimentally measuring a degree of interference to the FM antenna 15, which may change according to the sum of the first to third distances.

An electronic device may also be provided. The electronic device may be compatible with the digital earphones 100 shown in FIG. 2. That is, the electronic device may include a second communication interface corresponding to the first communication interface of the digital earphones 100 for a connection with the first communication interface. A structure of the electronic device 200 and an interaction between the electronic device 200 and the digital earphones 100 are described herein with reference to FIG. 4.

Figure 4:
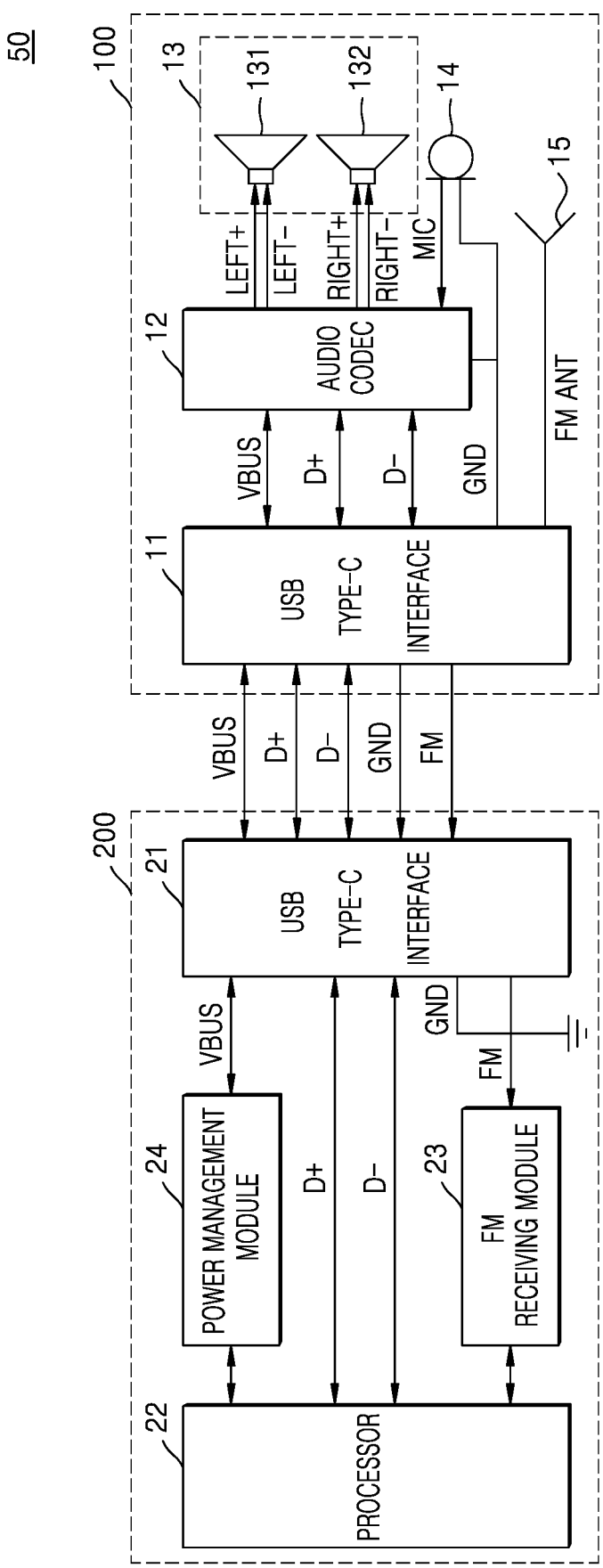
FIG. 4 illustrates a block diagram of an audio processing system according to an embodiment.

FIG. 4 illustrates a block diagram of an audio processing system 50 according to an embodiment.

The audio processing system 50 may include the digital earphones 100 and the electronic device 200. The embodiments are not limited to the digital earphones 100, but may also include audio output devices such as a digital headset, wearable devices or the like.

Furthermore, the electronic device 200 may be an electronic device such as a smart phone, a tablet computer, a notebook computer, a personal digital assistant, a game console, or the like, which has a communication interface compatible with the digital earphones 100.

As shown in FIG. 4, the electronic device 200 may include a second communication interface 21, a processor 22, and an FM receiving module 23.

Specifically, a third terminal of the second communication interface 21 may be connected to the processor 22. The processor 22 may cause the third terminal of the second communication interface 21 to transmit the digital audio stream signals to the digital earphones 100 and receive the digital microphone audio signals from the digital earphones 100 in a state of being connected to the digital earphones 100. For example, the third terminal of the second communication interface 21 may be a data terminal of the second communication interface 21. Additionally, the third terminal of the second communication interface 21 may be a data terminal which is compatible with and connected to the third terminal of the first communication interface 11. The second communication interface 21 may receive a second digital signal from the third terminal of the first communication interface 11 through the third terminal of the second communication interface 21. The second communication interface 21 may transmit a first digital signal to the third terminal of the first communication interface 11 through the third terminal of the second communication interface 21.

Figure 5:
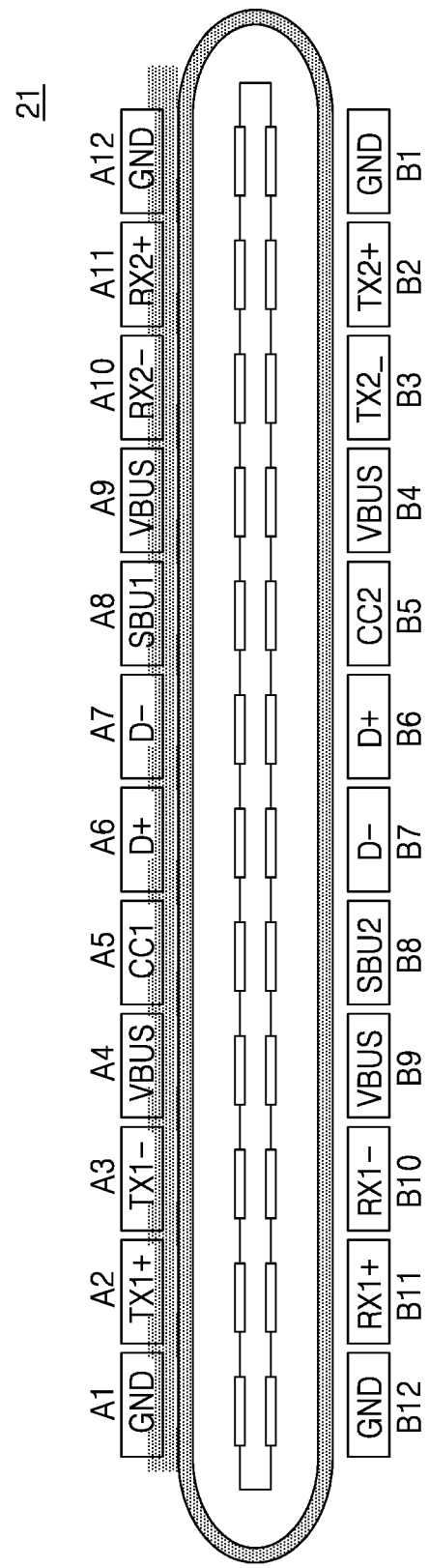
FIG. 5 illustrates a diagram of ports of a universal serial bus Type-C interface of an electronic device side, according to an embodiment.

The second communication interface 21 may be a universal serial bus Type-C interface, that is, a USB Type-C interface. FIG. 5 illustrates a diagram of ports of a universal serial bus Type-C interface of the electronic device 200 side according to an embodiment. Referring to FIG. 5, the USB Type-C interface of the electronic device 200 side may be a universal serial bus Type-C socket, that is, a USB Type-C socket. The USB Type-C socket is also referred to as a USB Type-C female. However, it should be understood that the disclosure is not limited thereto. The USB Type-C interface of the electronic device 200 side may also be a USB Type-C plug, as long as the USB Type-C interface of the digital earphones 100 side may be compatible with and connected to the USB Type-C interface of the electronic device 200 side.

As shown in FIG. 5, the USB Type-C socket has a total of 24 terminals, which may be plugged forward or backward, that have high transmission speeds. In addition, the USB Type-C interface does not have directionality.

An A1 (or B1) GND terminal and an A12 (or B12) GND terminal of the USB Type-C socket are ground GND terminals. A2 TX1+ (or B2 TX2+) and A3 TX1− (or B3 TX2−) may be data transmitting terminals, and A10 RX2− (or B10 RX1−) and A11 RX2+ (or B11 RX1+) may be data receiving terminals. The data transmitting terminals and the data receiving terminals may be used to transmit a first group configured by TX signals and a second group configured by RX signals, respectively. A first terminal of the second communication interface 21 may be a ground terminal of the second communication interface 21. When the second communication interface 21 is a USB Type-C socket, the first terminal of the second communication interface 21 may be one of a first ground terminal of the USB Type-C socket and a second ground terminal of the USB Type-C socket. In addition, the first ground terminal of the USB Type-C socket may be the A1 (or B1) GND terminal of the USB Type-C socket, and the second ground terminal of the USB Type-C socket may be the A12 (or B12) GND terminal of the USB Type-C socket.

An A4 (or B4) VBUS terminal and an A9 (or B9) VBUS terminal of the USB Type-C socket are terminals for bus power supply. An A5 CC1 (or B5 CC2) terminal may be a detection terminal, which may be, for example, used to detect a connection to distinguish forward and backward plugging, and may also be used to configure an interface mode to determine whether the interface is currently used as a charging interface, a data interface, a digital earphones interface, or a video output interface. A fourth terminal of the second communication interface 21 may be a terminal for bus power supply of the second communication interface 21. When the second communication interface 21 is a USB Type-C socket, the fourth terminal of the second communication interface 21 may include the A4 (or B4) VBUS terminal and the A9 (or B9) VBUS terminal of the USB Type-C socket.

An A6 (or B6) D+ terminal and an A7 (or B7) D− terminal of the USB Type-C socket may be terminals compatible with a general USB standard. For example, the D+ and D− terminals configured to transmit data may be a pair of differential signal terminals compatible with a USB 2.0 standard. An A8 SBU (or B8 SBU2) terminal of the USB Type-C socket is an auxiliary signal SBU terminal.

When the second communication interface 21 is a USB Type-C interface, data terminals of the second communication interface 21 may be the D+ terminal and the D− terminal of the USB Type-C interface configured to transmit data.

That is, the D+ terminal and the D− terminal of the second communication interface 21 may receive the digital microphone audio signals from the digital earphones 100 or transmit the digital audio stream signals to the digital earphones 100 in a state of being connected to the digital earphones 100.

A ground terminal of the second communication interface 21 may be grounded. For example, the first terminal of the second communication interface 21 may be grounded.

When the second communication interface 21 is a USB Type-C interface, the ground terminal of the second communication interface 21 may be one of the first ground GND terminal of the USB Type-C interface and the second ground GND terminal of the USB Type-C interface.

Referring to FIG. 5, the first ground GND terminal may be one of the A1 (or B1) GND terminal and the A12 (or B12) GND terminal of the USB Type-C socket, and the second ground GND terminal may be the other one of the A1 (or B1) GND terminal and the A12 (or B12) GND terminal of the USB Type-C socket.

One end of the FM receiving module 23 may be connected to the processor 22, and the other end of the FM receiving module 23 may be connected to a terminal of the second communication interface 21 configured to implement an FM function and receive FM signals from the digital earphones 100 in a state of being connected to the digital earphones 100. According to an embodiment, one end of the FM receiving module 23 may be connected to the processor 22, and the other end of the FM receiving module 23 may be directly connected to the second terminal of the second communication interface 21. The second terminal of the second communication interface 21 may be compatible with and connected to the second terminal of the first communication interface 11. For example, the second communication interface 21 may receive FM signals from the second terminal of the first communication interface 11 through the second terminal of the second communication interface 21. The second communication interface 21 may directly transmit the FM signals to the FM receiving module 23 through the second terminal of the second communication interface 21.

That is, the FM antenna 15 of the digital earphones 100 may receive the FM signals and transmit the FM signals to the terminal of the first communication interface 11 configured to implement the FM function. The first communication interface 11 may transmit the FM signals to the terminal of the second communication interface 21 configured to implement the FM function to directly transmit the received FM signals to the FM receiving module 23.

When the second communication interface 21 is a USB Type-C interface, the terminal of the second communication interface 21 configured to implement the FM function may be one of the first ground GND terminal of the USB Type-C interface, the second ground GND terminal of the USB Type-C interface, and the auxiliary signal SBU terminal of the USB Type-C interface.

The auxiliary signal SBU terminal may be the A8 SBU1 (or B8 SBU2) terminal of the USB Type-C socket. It should be understood that the ground terminal of the second communication interface 21 is a terminal different from the terminal configured to implement the FM function.

According to an embodiment, an FM function of an electronic device may be implemented by a first ground GND terminal of a USB Type-C interface, a second ground GND terminal of the USB Type-C interface, and an auxiliary signal SBU terminal of the USB Type-C interface. When existing digital earphones using a digital USB interface are connected to an electronic device, the first ground GND terminal and the second ground GND terminal do not need to operate at the same time, and one of the first ground GND terminal and the second ground GND terminal may receive GND/FM ANT signals from the digital earphones 100. The auxiliary signal SBU terminal is generally used for water vapor/water mist detection, and does not operate when the existing digital earphones are connected to the electronic device.

That is, when the existing digital earphones are connected to the electronic device, the FM function may be implemented by an idle terminal, without changing the structure of the USB Type-C interface.

Furthermore, the electronic device 200 may supply power to the outside through the second communication interface 21. In this case, the electronic device 200 may further include a power management module 24.

For example, when the electronic device 200 is connected to the digital earphones 100, one end of the power management module 24 may be connected to the processor 22 and the other end of the power management module 24 may be connected to the fourth terminal of the second communication interface 21 to output power signals through the fourth terminal of the second communication interface 21. For example, the fourth terminal of the second communication interface 21 may be a power terminal of the second communication interface 21.

When the second communication interface 21 is a USB Type-C interface, the power terminal of the second communication interface 21 may be a VBUS terminal of the USB Type-C interface for bus power supply.

Referring to FIG. 5, the VBUS terminal for bus power supply may be the A4 (or B4) VBUS terminal or the A9 (or B9) VBUS terminal of the USB Type-C socket.

For example, the FM receiving module 23 and/or the power management module 24 may be arranged on a circuit board of the electronic device 200.

Figure 6:
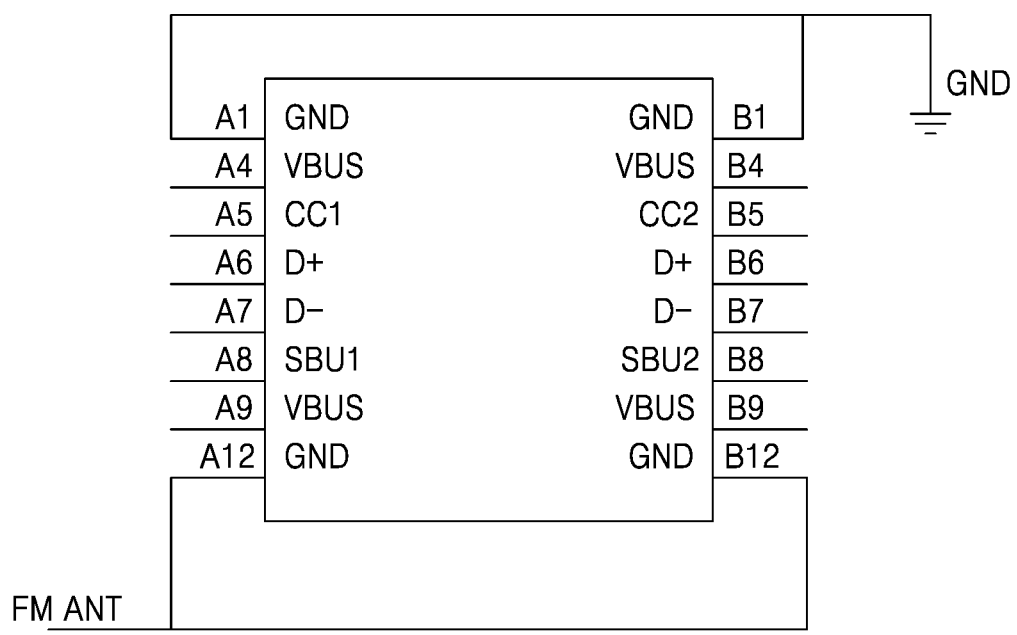
FIG. 6 illustrates a diagram of a terminal connection of a universal serial bus Type-C interface of an electronic device side, according to an embodiment.

FIG. 6 illustrates a diagram of a terminal connection of a universal serial bus Type-C interface of an electronic device side according to an embodiment.

Referring to FIG. 6, the universal serial bus Type-C interface of the electronic device side may be a USB Type-C socket. The first GND terminal of A1 (or B1) of the USB Type-C socket may be directly grounded to a ground terminal. The second GND terminal of A12 (or B12) of the USB Type-C socket may be used as a terminal configured to implement the FM function to receive FM signals from digital earphones.

It should be understood that FIG. 6 only shows connections of the ground terminal of the USB Type-C socket and the terminal configured to implement the FM function, and connections of other terminals are not listed one by one. In addition, the connections of the ground terminal and the terminal configured to implement the FM function shown in FIG. 6 are only an example. The second GND terminal of A12 (or B12) of the USB Type-C socket may be also used as a ground terminal, or the first GND terminal of A1 (or B1) of the USB Type-C socket may be used as a terminal configured to implement the FM function, or the auxiliary SBU terminal of A8 (or B8) of the USB Type-C socket may be used as a terminal configured to implement the FM function. Those skilled in the art may choose according to actual design requirements.

Figure 7:
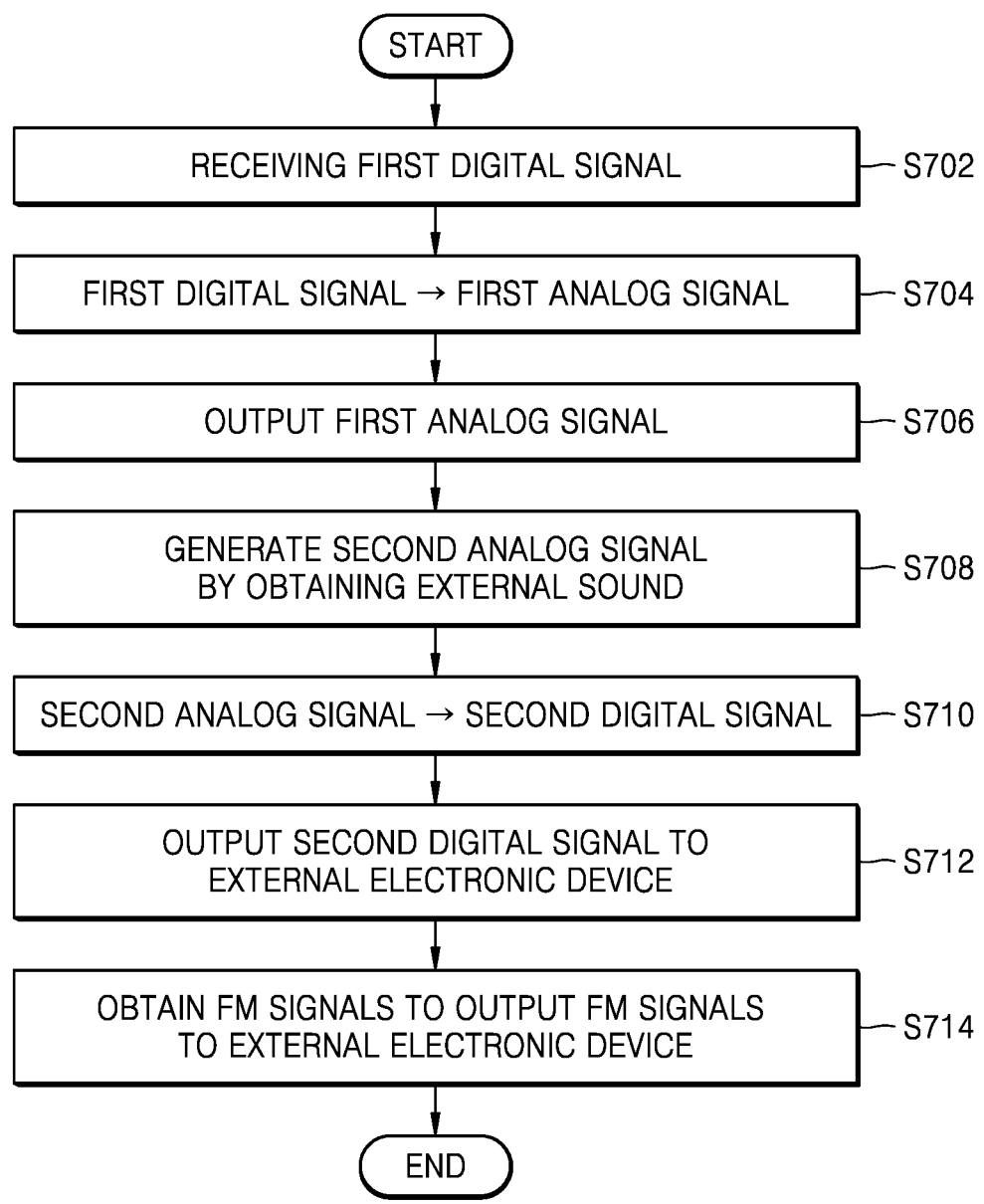
FIG. 7 illustrates a flowchart of an operation method of an audio output device according to an embodiment.

FIG. 7 illustrates a flowchart of an operation method of an audio output device according to an embodiment.

Referring to FIG. 7, in operation S702, the audio output device may receive a first digital signal from an external electronic device.

For example, the audio output device may include the digital earphones 100 according to an embodiment, and may further include a digital headset or the like. Also, the audio output device may be implemented as a wearable device. The external electronic device may correspond to the electronic device 200. That is, the external electronic device may include a smart phone, a computer, a notebook, or the like, which has a communication interface being compatible with a communication interface of the audio output device. Furthermore, the first digital signal may include digital audio stream signals.

In operation S704, the audio output device may convert the first digital signal into a first analog signal.

For example, the audio output device may perform a digital-to-analog conversion to convert the received first digital signal into the first analog signal. In addition, the first analog signal may include analog audio signals.

In operation S706, the audio output device may output the first analog signal. For example, the audio output device may output the first analog signal through a speaker.

In operation S708, the audio output device may generate a second analog signal by obtaining external sound. For example, the second analog signal may include analog microphone signals.

In operation S710, the audio output device may convert the second analog signal into a second digital signal. Specifically, the audio output device may perform an analog-to-digital conversion to convert the second analog signal, which is generated by obtaining the external sound, into the second digital signal Also, the second digital signal may include digital microphone audio signals.

In operation S712, the audio output device may output the second digital signal to the external electronic device.

In operation S714, the audio output device may obtain FM signals to output the FM signals to the external electronic device. For example, the audio output device may output the FM signals to the external electronic device through a terminal configured to implement an FM function of the audio output device. A ground terminal of the audio output device and the terminal configured to implement the FM function of the audio output device may be different terminals.

In another embodiment, the terminal configured to implement the FM function of the audio output device may be connected to the external electronic device through an independent signal line. That is, only the FM signals are transmitted from the audio output device to the external electronic device through the terminal configured to implement the FM function, and other signals including ground signals may be transmitted from the audio output device to the external electronic device through a terminal different from the terminal configured to implement the FM function.

Figure 8:
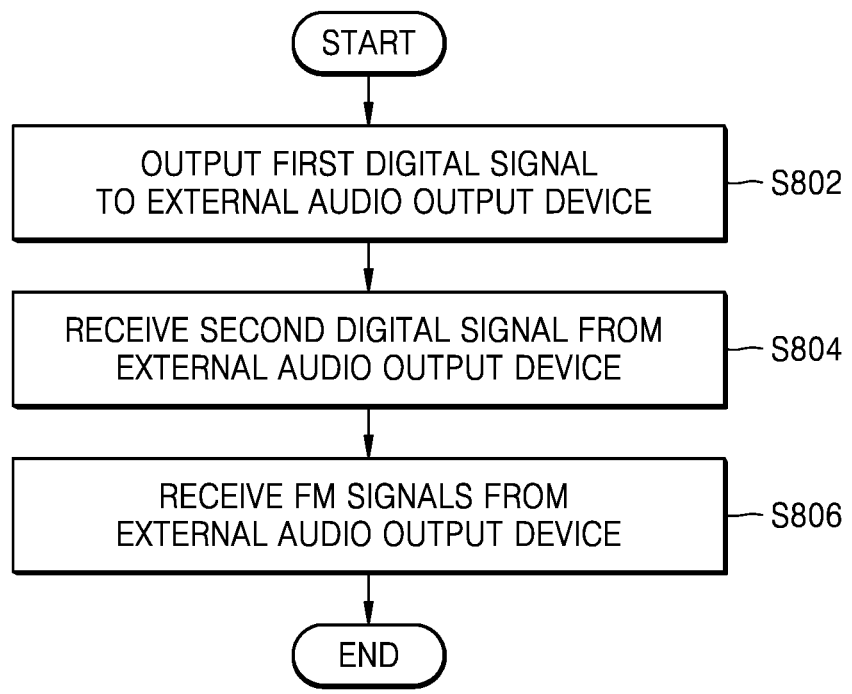
FIG. 8 illustrates a flowchart of an operation method of an electronic device according to an embodiment.

FIG. 8 illustrates a flowchart of an operation method of the electronic device 200 according to an embodiment.

In operation S802, the electronic device 200 may output a first digital signal to an external audio output device. For example, the external audio output device may include the digital earphones 100 according to an embodiment, and may further include a digital headset or the like. The first digital signal may include digital audio stream signals. For example, the digital audio stream signals may include digital multimedia audio stream signals and digital voice audio signals during a telephone call.

In operation S804, the electronic device 200 may receive a second digital signal from the external audio output device. The second digital signal may include the digital microphone audio signals.

In operation S806, the electronic device 200 may receive FM signals from the external audio output device. For example, the electronic device 200 may receive the FM signals from the external audio output device through a terminal configured to implement the FM function of the electronic device 200. The terminal configured to implement the FM function and a ground terminal of the electronic device 200 may be different terminals.

Alternatively, the terminal configured to implement the FM function of the electronic device 200 may be connected to the external audio output device through an independent signal line. That is, the electronic device 200 may only receive the FM signals from the external audio output device through the terminal configured to implement the FM function, and the electronic device 200 may receive other signals including ground signals from the external audio output device through a terminal different from the terminal configured to implement the FM function. Therefore, the electronic device 200 may not need a separate isolating circuit configured to separate the FM signals and the ground signals. Compared with existing electronic devices applicable to analog digital earphones, the electronic device 200 according to the embodiment not need an isolating circuit, thereby saving cost and space.

In the digital earphones 100 and the electronic device 200, the independent FM antenna 15 may be designed in the digital earphones 100, and FM carrier signals obtained by the FM antenna 15 are directly fed back to the FM receiving module 23 of the electronic device 200, such that the electronic device 200 does not need an isolating circuit. Accordingly, negative influence of noise generated by the ground signal line of the digital earphones 100 on the FM performance may be avoided when the audio codec 12 of the digital earphones 100 operates.

Digital earphones and an electronic device according to the embodiments provide a low-cost, high performance digital earphones FM circuit design for general USB Type-C digital earphones. An independent FM antenna circuit may be designed on the digital earphones side, and the FM carrier signals obtained by the FM antenna are directly fed back to an FM receiving module, such that an additional isolating circuit is not needed in the electronic device. Accordingly, negative influence of noise generated by the ground line of the digital earphones on the FM performance may be avoided when the audio codec of the digital earphones operates.

With the use of the digital earphones and the electronic device according to the embodiments, the FM antenna has a strong anti-interference ability, a high channel quality, and better FM performance than general 3.5 mm analog digital earphones or USB Type-C analog digital earphones.

According to an embodiment, the digital earphones may include a first communication interface; an audio codec; a speaker, a microphone, and an FM antenna, wherein the first communication interface in a state of being connected to the electronic device may receive digital audio stream signals from an electronic device, the audio codec may convert the digital audio stream signals received by the first communication interface into analog audio signals and output the converted analog audio signals through the speaker, the speaker may generate analog microphone signals by obtaining external sound, the audio codec may convert the analog microphone signals into digital microphone audio signals and output the digital microphone audio signals through the first communication interface, a ground terminal of the audio codec may be connected to a terminal of the first communication interface, and the FM antenna may be connected to a terminal of the first communication interface configured to implement an FM function to output FM signals received from the FM antenna through the terminal of the first communication interface.

For example, the first communication interface may be a USB Type-C interface.

For example, the terminal of the first communication interface configured to implement the FM function may be one of a first ground GND terminal, a second ground GND terminal, and an auxiliary signal SBU terminal of the USB Type-C interface.

For example, a ground terminal of the first communication interface may be one of the first ground GND terminal and the second ground GND terminal of the USB Type-C interface, and the ground terminal of the first communication interface and the terminal configured to implement the FM function may be different terminals from each other.

For example, the FM antenna may be made of a coaxial line.

For example, the FM antenna of the digital earphones may be arranged to be spaced apart from other signal lines of the digital earphones.

According to an embodiment, the electronic device may include a second communication interface; a processor; and an FM receiving module, wherein a data terminal of the second communication interface may be connected to the processor and transmit digital audio stream signals to digital earphones or receive digital microphone audio signals from the digital earphones in a state of being connected to the digital earphones, a ground terminal of the second communication interface may be grounded, one end of the FM receiving module may be connected to the processor and the other end of the FM receiving module may be connected to a terminal of the second communication interface to implement the FM function and receive FM signals from the digital earphones in a state of being connected to the digital earphones.

For example, the second communication interface may be a USB Type-C interface.

For example, the terminal of the second communication interface configured to implement the FM function may be one of the first ground GND terminal, the second ground GND terminal, and the auxiliary signal SBU terminal of the USB Type-C interface.

For example, the ground terminal of the second communication interface may be one of the first ground GND terminal and the second ground GND terminal of the USB Type-C interface, and the ground terminal and the terminal configured to implement the FM function of the second communication interface may be terminals different from each other.

Various embodiments of the disclosure have been described above. It should be understood that above descriptions are only example embodiments and are not exhaustive, and the embodiments of the disclosure may not be limited to the disclosed embodiments. Many modifications, alterations and substitutions will be apparent to those of ordinary skill in the art without departing from the scope and spirit of the embodiments of the disclosure. Therefore, the protection scope of the disclosure are shown in the above detailed description and the following claims, and it should be understood that all changes and modifications derived from the meaning and scope of the claims, and equivalent concepts thereof are included in the scope of the disclosure.

What is claimed is:
1. An audio output device comprising:
at least one speaker;
a microphone;

a first communication interface configured to receive a first digital signal from an external electronic device and transmit a second digital signal to the external electronic device;
at least one processor configured to convert the received first digital signal into a first analog signal and convert a second analog signal into the second digital signal; and
a frequency modulation (FM) antenna configured to obtain FM signals and output the FM signals to the external electronic device through the first communication interface,
wherein a ground terminal of the at least one processor is connected to a first terminal of the first communication interface,
wherein the FM antenna is connected to a second terminal of the first communication interface, and
wherein the FM signals are transmitted from the FM antenna to the second terminal of the first communication interface.

2. The audio output device of claim 1, wherein the first communication interface comprises a universal serial bus (USB) Type-C interface.

3. The audio output device of claim 2, wherein the first terminal of the first communication interface is at least one of a first ground terminal of the USB Type-C interface and a second ground terminal of the USB Type-C interface.

4. The audio output device of claim 3, wherein the second terminal of the first communication interface is at least one of the first ground terminal, the second ground terminal, and an auxiliary signal terminal of the USB Type-C interface, and
wherein the first terminal and the second terminal are terminals different from each other.

5. The audio output device of claim 1,
wherein the microphone is configured to generate the second analog signal based on an external sound, and
wherein the at least one speaker is configured to receive the converted first analog signal from the at least one processor and output the converted first analog signal.

6. The audio output device of claim 1, wherein the FM antenna comprises a coaxial structure.

7. An electronic device comprising:
at least one processor;
a second communication interface configured to transmit a first digital signal to an external audio output device, and receive a second digital signal and frequency modulation (FM) signals from the external audio output device; and
an FM receiving module configured to receive the FM signals from the second communication interface through a second terminal of the second communication interface,
wherein a first terminal of the second communication interface is grounded,
wherein the FM receiving module is directly connected to the second terminal of the second communication interface, and
wherein the FM signals are transmitted from the external audio output device to the second terminal of the second communication interface.

8. The electronic device of claim 7, wherein the second communication interface comprises a USB Type-C interface.

9. The electronic device of claim 8, wherein the first terminal of the second communication interface is at least one of a first ground terminal of the USB Type-C interface and a second ground terminal of the USB Type-C interface.

10. The electronic device of claim 9, wherein the second terminal of the second communication interface is at least one of the first ground terminal, the second ground terminal, and an auxiliary signal terminal of the USB Type-C interface, and
wherein the first terminal and the second terminal are terminals different from each other.

11. The electronic device of claim 7, wherein a first end of the FM receiving module is connected to the at least one processor,
wherein a second end of the FM receiving module is connected to the second terminal of the second communication interface, and
wherein the received second digital signal is transmitted to the at least one processor through a third terminal of the second communication interface connected to the at least one processor.

12. The electronic device of claim 7, further comprising:
a power management module configured to generate a power signal,
wherein a first end of the power management module is connected to the at least one processor,
wherein a second end of the power management module is connected to a fourth terminal of the second communication interface, and
wherein the power signal is output to the external audio output device through the fourth terminal of the second communication interface.

13. The electronic device of claim 7, wherein the electronic device is a smart phone including the second communication interface corresponding to a first communication interface of the external audio output device.

14. An audio processing system comprising an audio output device and an electronic device,
the audio output device comprising:
a first communication interface configured to receive a first digital signal from the electronic device and output a second digital signal to the electronic device;
at least one speaker;
a microphone;
at least one processor configured to convert the first digital signal into a first analog signal and convert a second analog signal into the second digital signal, the at least one processor being connected to a first terminal of the first communication interface; and
a frequency modulation (FM) antenna connected to a second terminal of the first communication interface and configured to output FM signals through the second terminal of the first communication interface, and
the electronic device comprising:
a second communication interface configured to output the first digital signal to the audio output device, and receive the second digital signal and the FM signals from the audio output device; and
an FM receiving module directly connected to a second terminal of the second communication interface and configured to receive the FM signals from the second terminal of the second communication interface.

15. The audio processing system of claim 14, wherein the second communication interface is configured to receive the FM signals from the second terminal of the first communication interface through the second terminal of the second communication interface.

16. The audio processing system of claim 15, wherein a first terminal of the second communication interface is grounded.

17. The audio processing system of claim 16, wherein the first communication interface and the second communication interface are USB Type-C interfaces.

18. The audio processing system of claim 17, wherein the first terminal of the first communication interface and the first terminal of the second communication interface are at least one of a first ground terminal of the USB Type-C interface and a second ground terminal of the USB Type-C interface.

19. The audio processing system of claim 18, wherein the second terminal of the first communication interface and the second terminal of the second communication interface are any one of the first ground terminal, the second ground terminal, and an auxiliary signal terminal of the USB Type-C interface,
- wherein the first terminal of the first communication interface and the second terminal of the first communication interface are terminals different from each other, and
- wherein the first terminal of the second communication interface and the second terminal of the second communication interface are terminals different from each other.

20. The audio processing system of claim 14, wherein the FM antenna comprises a coaxial structure.

* * * * *